US008823280B2

(12) United States Patent
Shiu et al.

(10) Patent No.: US 8,823,280 B2
(45) Date of Patent: Sep. 2, 2014

(54) LED DRIVING CIRCUIT

(75) Inventors: Shian-Sung Shiu, New Taipei (TW);
Chia-Ming Chan, New Taipei (TW);
Li-Min Lee, New Taipei (TW);
Chung-Che Yu, New Taipei (TW)

(73) Assignee: Green Solution Technology Co., Ltd., New Taipei (TW)

( * ) Notice: Subject to any disclaimer, the term of this patent is extended or adjusted under 35 U.S.C. 154(b) by 211 days.

(21) Appl. No.: 13/567,101

(22) Filed: Aug. 6, 2012

(65) Prior Publication Data

US 2013/0271006 A1 Oct. 17, 2013

(30) Foreign Application Priority Data

Apr. 17, 2012 (TW) .............................. 101113537 A

(51) Int. Cl.
*G05F 1/00* (2006.01)
*H05B 37/02* (2006.01)

(52) U.S. Cl.
USPC .............................. 315/291; 315/307; 315/121

(58) Field of Classification Search
None
See application file for complete search history.

(56) References Cited

U.S. PATENT DOCUMENTS

| 2011/0148323 | A1* | 6/2011 | Yao et al. | 315/295 |
| 2012/0049761 | A1* | 3/2012 | Yu et al. | 315/294 |
| 2012/0056865 | A1* | 3/2012 | Shih et al. | 345/212 |
| 2012/0104967 | A1* | 5/2012 | Lee et al. | 315/291 |
| 2012/0268011 | A1* | 10/2012 | Shiu et al. | 315/121 |
| 2013/0119867 | A1* | 5/2013 | Yu et al. | 315/120 |

* cited by examiner

*Primary Examiner* — Jany Richardson
(74) *Attorney, Agent, or Firm* — Jianq Chyun IP Office

(57) ABSTRACT

An LED driving circuit comprises a converting circuit, a current regulator, a converting controller and a low dimming protection blocking circuit, is disclosed. The converting circuit is adapted to perform a power conversion to provide a driving voltage for lighting an LED module. The current regulator is coupled to the LED module for regulating a current flowing through the LED module. The current regulator conducts and stops conducting the current flowing through the LED module according to a dimming signal, and executes a protection process when the LED module operates abnormal. The converting controller controls the power conversion of the converting circuit according to a voltage level of at least one connection node of the current regulator and the LED module. The low dimming protection blocking circuit stops the protection process of the current regulator when the driving voltage is lower than a predetermined value.

14 Claims, 3 Drawing Sheets

US 8,823,280 B2

LED DRIVING CIRCUIT

CROSS-REFERENCE TO RELATED APPLICATION

This application claims the priority benefit of Taiwan application serial no. 101113537, filed on Apr. 17, 2012. The entirety of the above-mentioned patent application is hereby incorporated by reference herein and made a part of this specification.

BACKGROUND

1. Field of the Invention

The present invention relates to an LED driving circuit, and more particularly relates to an LED driving circuit with low dimming protection blocking function.

2. Description of Related Art

FIG. 1 is a schematic diagram of a conventional LED driving circuit. The LED driving circuit comprises a converting circuit 130, a current regulator and a converting controller 120. The converting circuit 130 is coupled to an input power source Vin to convert the input power source Vin into a driving voltage Vout for lighting an LED module LM. The current regulator comprises a current regulating controller 100, a transistor M and a current detecting resistance R. A first end of the transistor M is coupled to an end of the LED module LM and a second end thereof is coupled to the current detecting resistance R. A current flowing through the LED module LM also flows through the current detecting resistance R, so as to generate a current detecting signal Cs indicative of the current of the LED module LM. The converting controller 120 is coupled to a connection node of the transistor M and the LED module LM and controls a power conversion of the converting circuit 130 according to a voltage feedback signal VFB of the connection node.

The current regulating controller 100 comprises a controller 102, an open-circuit comparator 104, a counter 115 and an OR gate 110. The controller 102 generates a current control signal Ga according to the current detecting signal Cs and a reference voltage signal Vr to regulate an on-resistance of the transistor M, thereby stabilizing the current flowing through the LED module LM at a predetermined current value. The converting circuit 130 can not provide the current flowing through the LED module LM when the LED module LM is open-circuit. A voltage level of the current detecting signal Cs is down to 0V and so is lower than a voltage level of an open-circuit judgment voltage Vop at this time. The open-circuit comparator 104 generates a high-level signal when the voltage level of the current detecting signal Cs is lower than the voltage level of the open-circuit judgment voltage Vop. The counter 115 is coupled to a counting capacitance Ct and executes time counting when receiving the high-level signal generated by the open-circuit comparator 104 for avoid an erroneous judgment due to a dimming signal or other noises. The counter 115 outputs a blocking conduction signal Fa when the time period of the open-circuit comparator 104 generating the high-level signal is longer than a predetermined period of the counter 115. The OR gate 110 is coupled to the counter 115 and receives a dimming signal Dim. The OR gate 110 regulates the current controlling signal Ga according to the dimming signal Dim for conducting and stopping to conduct the current flowing through the LED module LM. When the counter 115 generates the blocking conduction signal Fa, the controller 102 turns off the transistor M to stop lighting the LED module LM.

When the converting circuit 130 and the converting controller 120 operate normally and the dimming signal Dim is at low dimming, the voltage of the connection node of the transistor M and the LED module LM will be increase to a higher voltage level. Then, the converting controller 120 judges that the driving voltage Vout is over-high and then decreases the voltage level of the driving voltage Vout. Under this situation, the voltage level of the current detecting signal Cs is still lower than the voltage level of the open-circuit judgment voltage Vop even though the transistor M is turned on according to the dimming signal Dim afterward. The current regulating controller 100 judges incorrectly that the LED module LM is open-circuit and then executes a latch protection. Therefore, the conventional LED driving circuit has a problem of not starting and operating when the dimming signal is at low dimming or a noise are erroneously judged as a dimming signal. Even after the dimming signal is turned to be at high dimming, the LED driving circuit still cannot be restored to operate due to the latch protection.

SUMMARY

In view of the conventional LED driving circuit cannot start and operate at low dimming, the present invention uses a low dimming protection blocking circuit to stop a protection process of a current regulating controller when detecting a low dimming or a driving voltage for an LED module being over-low. Thereby, the present invention avoids the LED driving circuit executing a latch protection.

To accomplish the aforementioned and other objects, an exemplary embodiment of the invention provides an LED driving circuit comprising a converting circuit, a current regulator, a converting controller and a low dimming protection blocking circuit. The converting circuit is adapted to perform a power conversion to convert an input power into a driving voltage for lighting an LED module. The current regulator is coupled to the LED module for regulating a current flowing through the LED module. The current regulator conducts and stops conducting the current flowing through the LED module according to a dimming signal. The current regulator executes a protection process when the LED module operates abnormally. The converting controller controls the power conversion of the converting circuit according to a voltage level of at least one connection node of the current regulator and the LED module. The low dimming protection blocking circuit is coupled to the current regulator and the converting circuit, and stops the protection process of the current regulator when the driving voltage is lower than a predetermined voltage value.

To accomplish the aforementioned and other objects, an exemplary embodiment of the invention further provides an LED driving circuit comprising a converting circuit, a current regulator, a converting controller and a low dimming protection blocking circuit. The converting circuit is adapted to perform a power conversion to convert an input power into a driving voltage for lighting an LED module. The current regulator is coupled to the LED module to regulate a current flowing through the LED module. The current regulator conducts and stops conducting the current flowing through the LED module according to a dimming signal. The current regulator executes a protection process when the LED module operates abnormally. The converting controller controls the power conversion of the converting circuit according to a voltage level of at least one connection node of the current regulator and the LED module. The low dimming protection blocking circuit is coupled to the current regulator. The low dimming protection blocking circuit receives the dimming signal and stops the protection process of the current regulator when a turn-on pulse width of the dimming signal is smaller than a predetermined pulse width.

To accomplish the aforementioned and other objects, an exemplary embodiment of the invention further provides an LED driving circuit comprising a converting circuit, a current regulator, a converting controller and a low dimming protection blocking circuit. The converting circuit is adapted to perform a power conversion to convert an input power source into a driving voltage for lighting an LED module. The current regulator is coupled to the LED module to regulate a current flowing through the LED module. The current regulator comprises at least one current regulating element which comprises a transistor, a controller and a protection circuit. The transistor is coupled to a driving end of a corresponding one of the LED module and regulates the current flowing through the LED module according to a current controlling signal. The controller detects the current flowing through the LED module and accordingly generates the current controlling signal. The controller controls the transistor to conduct of stop conducting the current according to a dimming signal. The protection circuit detects a state of the transistor to judge whether the LED module operates abnormally or not. If the LED module operates abnormally, the transistor is turned off. The converting controller controls the power conversion of the converting circuit according to a voltage level of at least one connection node of the current regulator and the LED module. The low dimming protection blocking circuit is coupled to the current regulator. The low dimming protection blocking circuit receives the least one current controlling signal and stops the protection process of the current regulator when a pulse width of any one of the least current controlling signal is lower than a predetermined pulse width.

It is to be understood that both the foregoing general description and the following detailed description are exemplary, and are intended to provide further explanation of the invention as claimed. In order to make the features and the advantages of the invention comprehensible, exemplary embodiments accompanied with figures are described in detail below.

BRIEF DESCRIPTION OF THE DRAWINGS

The present invention will now be specified with reference to its preferred embodiment illustrated in the drawings, in which.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
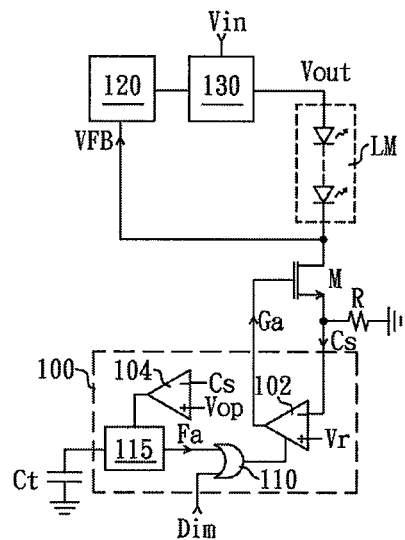
FIG. 1 is a schematic diagram of a conventional LED driving circuit.
Figure 2:
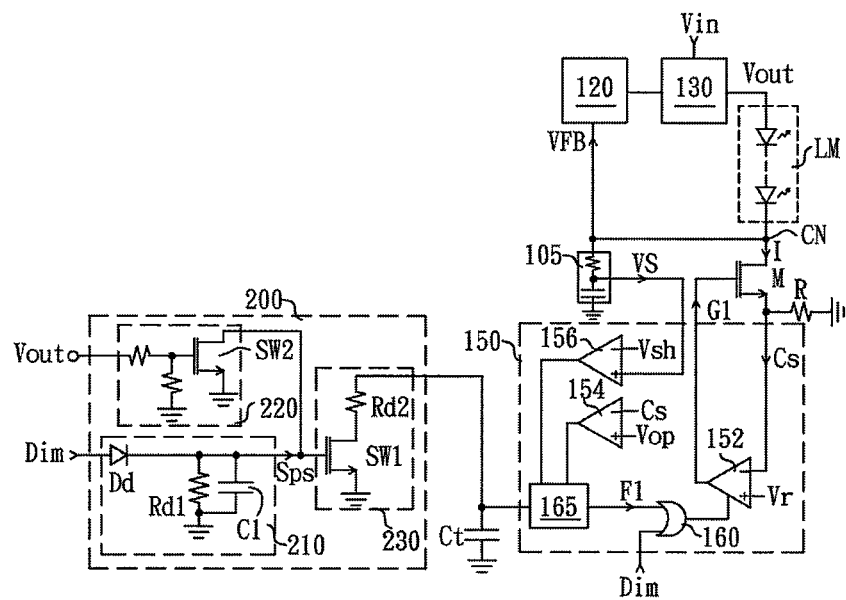
FIG. 2 is a schematic diagram of an LED driving circuit according to a first embodiment of the present invention.

FIG. 2 is a schematic diagram of an LED driving circuit according to a first embodiment of the present invention. The LED driving circuit comprises a converting controller 120, a converting circuit 130, a current regulator and a low dimming protection blocking circuit 200. The converting circuit 130 is adapted to perform a power conversion to convert an input power source Vin into a driving voltage Vout for lighting an LED module LM. The current regulator is coupled to the LED module LM for regulating a current I flowing through the LED module LM. The current regulator conducts and stops conducting the current I flowing through the LED module LM according to a dimming signal Dim, and executes a protection process when the LED module LM operates abnormally.

The current regulator comprises a current regulating controller 150, a transistor M and a current detecting resistance R. A first end of the transistor M is coupled to an end of the LED module LM and a second end thereof is coupled to the current detecting resistance R. The current I flowing through the LED module LM flows through the current detecting resistance R, so as to generate a current detecting signal Cs. The converting controller 120 is coupled to a connection node CN of the LED module LM and the transistor M and controls the power conversion of the converting circuit 130 according to a voltage feedback signal VFB of the connection node CN. The current regulating controller 150 comprises a controller 152, a protection circuit and an OR gate 160, in which the protection circuit comprises an open-circuit comparator 154, a short-circuit comparator 156 and a counter 165. The controller 152 generates a current controlling signal G1 according to the current detecting signal Cs and a reference voltage signal Vr to adjust an on-resistance of the transistor M to maintain the current I flowing through the LED module LM at a predetermined current value. When LED module LM is open-circuit, the converting circuit 130 does not provide the power to the LED module LM any more. A voltage level of the current detecting signal Cs is decreased approximately to 0V and so is lower than an open-circuit judgment voltage Vop at this time. The open-circuit comparator 154 generates a high-level signal when the voltage level of the current detecting signal Cs is lower than the voltage level of the open-circuit judgment voltage Vop. An LED fault detecting circuit 105 is coupled to the connection node CN of the LED module LM and the transistor M, which comprises a resistance and a capacitance connected in series, to smoothing a voltage detecting signal VS. When the LED module LM is short-circuit, the voltage level of the connection node CN of the LED module LM and the transistor M is increased abnormally to a high voltage level. A voltage level of the voltage detecting signal VS is higher than a voltage of a short-circuit judgment voltage Vsh. The short-circuit comparator 156 generates a high-level signal when the voltage level of the voltage detecting signal VS is higher than the voltage level of the short-circuit judgment voltage Vsh.

The counter 165 is coupled to a counting capacitance Ct and determines a time period according to a capacitance value of the counting capacitance Ct. The counter 165 starts to count when receiving a high level signal generated by the open-circuit comparator 154 or the short-circuit comparator 156, for avoiding erroneous judgment due to the dimming signal Dim or other noises. The counter 165 outputs a blocking conduction signal F1 when a time period of the open-circuit comparator 154 or the short-circuit comparator 156 generating the high-level signal is longer than a predetermined period of the counter 165. The OR gate 160 is coupled to the counter 165. The OR gate 160 receives the dimming signal Dim and controls the controller 152 to adjust the current controlling signal G1 for conducting and stopping to conduct the current I flowing through the LED module LM according to the dimming signal Dim. When the counter 165 outputs the blocking conduction signal F1 while judging that the LED module LM is open-circuit or short-circuit, the controller 152 executes a protection process, such as turning off the transistor M until that the abnormal state is removed, turning off the transistor M until that the current regulator is restart, etc.

The low dimming protection blocking circuit 200 comprises a dimming detecting circuit 210, an output voltage detecting circuit 220 and a protection blocking circuit 230. The dimming detecting circuit 210 comprises a diode Dd and a RC circuit, in which a positive end of the diode Dd receives the dimming signal Dim and a negative end thereof is coupled to the RC circuit. A capacitance C1 in the RC circuit is charged for generating a protection blocking signal Sps when the dimming signal Dim is input and no matter how small the pulse width is. The output voltage detecting circuit 220 comprises a voltage divider and a switch SW2, in which an end of the voltage divider is coupled to the converting circuit 130 to determine whether turning the switch SW2 on or not according to the driving voltage Vout. An end of the switch SW2 is coupled to the dimming detecting circuit 210. A voltage level of the protection blocking signal Sps is decreased when the switch SW2 is turned on, for blocking the generation of the protection blocking signal Sps. That is, when the voltage level of the driving voltage Vout is lower than a predetermined voltage value, the dimming detecting circuit 210 can normally generate the protection blocking signal Sps due to that the switch SW2 is turned off. On the other hand, when the voltage level of the driving voltage Vout is higher than or equal to the predetermined voltage value and the switch SW2 is turned on, the protection blocking signal Sps is stopped being generated. The protection blocking circuit 230 comprises a resistance Rd2 and a switch SW1 and is coupled to the protection circuit in the current regulating controller 150 and the dimming detecting circuit 210. When the switch SW1 is turned on by the protection blocking signal Sps, the counting capacitance Ct is discharged and so the current regulator can time count to determine whether executing the protection process. Therefore, the protection process of the current regulator is stopped when the protection blocking circuit 230 receives the protection blocking signal Sps to turn the switch SW1 on.

Figure 3:
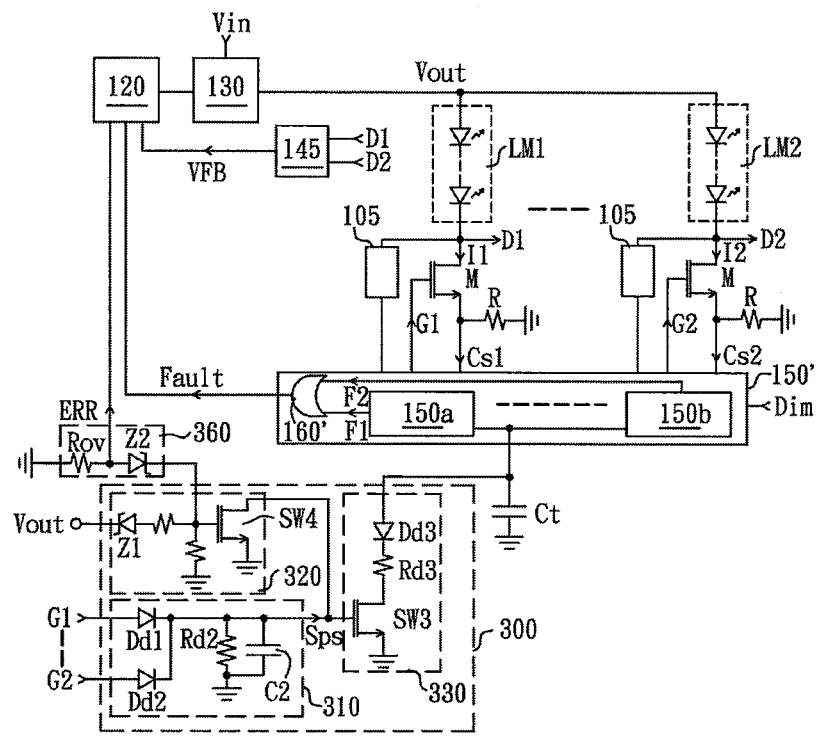
FIG. 3 is a schematic diagram of an LED driving circuit according to a second embodiment of the present invention.

FIG. 3 is a schematic diagram of an LED driving circuit according to a second embodiment of the present invention. Compared to the embodiment shown in FIG. 2, the main differences there between are that an LED module comprises a plurality of LED strings and a low dimming protecting blocking circuit judges according to a current controlling signal generated by a current regulator in the present embodiment. The detailed descriptions are as below.

The LED module comprises at least two LED strings LM1, LM2 which are respectively coupled to at least two current regulating elements 150a and 150b of a current regulator 150'. The structure of the current regulating elements 150a and 150b can be referred to the current regulating controller 150 shown in FIG. 2. Currents I1 and I2 flowing through the LED strings LM1 and LM2 flows through a current detecting resistances R, so as to respectively generate current detecting signals Cs1 and Cs2. The current regulating elements 150a and 150b generate current controlling signals G1 and G2 according to the current detecting signals Cs1 and Cs2 to stabilize the current I1 and I2 flowing through the LED strings LM1 and LM2 at a predetermined current value. A minimum voltage detecting circuit 145 is coupled to negative ends of the at least two LED strings LM1 and LM2, and generates a voltage feedback signal VFB according to the lowest one of terminal voltages D1 and D2 of the negative ends. A converting controller 120 controls a power conversion of a converting circuit 130 for regulating a driving voltage Vout according to the voltage feedback signal VFB.

The current regulating elements 150a and 150b in the current regulator 150' correspondingly detect the states of the LED strings LM1 and LM2, and generate blocking conduction signals F1 and F2 when detecting abnormal state for a predetermined period, wherein the predetermined period is determined by a counting capacitance Ct. An OR gate 160' is coupled the current regulating elements 150a and 150b, and generates a fault notice signal Fault to the converting controller 120. The converting controller 120 may stop the power conversion of the converting circuit 130 when receiving the fault notice signal Fault.

A low dimming protection blocking circuit 300 comprises a dimming detecting circuit 310, an output voltage detecting circuit 320 and a protection blocking circuit 330. The dimming detecting circuit 310 comprises at least two diodes Dd1 and Dd2 and a RC circuit. Positive ends of the diodes Dd1 and Dd2 are correspondingly coupled to the current regulating elements 150a and 150b in the current regulator 150' for receiving the current controlling signals G1 and G2 and negative ends thereof are coupled to the RC circuit which comprises a resistance and a capacitance C2 connected in parallel. The current regulator 150' generates the current controlling signals G1 and G2 according to a dimming signal Dim. The capacitance C2 is charged for generating a protection blocking signal Sps when the dimming detecting circuit 310 detects any one of the current controlling signals G1 and G2. The output voltage detecting circuit 320 comprises a zener diode Z1, a voltage divider and a switch SW4. A negative end of the zener diode Z1 is coupled to the converting circuit 130 and a positive end thereof is coupled to the voltage divider. The zener diode Z1 turns the switch SW4 on when the voltage level of the driving voltage Vout is higher than or equal to a predetermined voltage value. The function of the zener diode Z1 is to accurately turn on the switch SW4 at an expected voltage value of the driving voltage Vout. An end of the switch SW4 is coupled to the dimming detecting circuit 310. When the switch SW4 is turned on, a voltage level of the protection blocking signal Sps is decreased for blocking the generation of the protection blocking signal Sps. The protection blocking circuit 330 comprises a diode Dd3, a resistance Rd3 and a switch SW3. The protection blocking circuit 330 is coupled to the dimming detecting circuit 310 and the counting capacitance Ct of the current regulator 150'. When the protection blocking signal Sps turns on the switch SW3, the protection blocking circuit 330 discharges the counting capacitance Ct and so the current regulating elements 150a and 150b cannot count to achieve the object of prohibiting the protection process of the current regulator 150'.

Besides, an over-voltage protection circuit 360 is added extra in the present embodiment. The over-voltage protection circuit 360 comprises a resistance Rov and a zener diode Z2. A negative end of the zener diode Z2 is coupled to a voltage dividing node of the voltage divider in the output voltage detecting circuit 320, a positive end of the zener diode Z2 is coupled to an end of the resistance Rov for generating an over-voltage notice signal ERR and the other end of the resistance Rov is grounded. When the driving voltage Vout is normal (i.e., higher than the predetermined voltage value), the low dimming protection blocking circuit 300 does not discharge the counting capacitance Ct due to that the output voltage detecting circuit 320 blocks the generation of the protection blocking signal Sps. At this time, the current regulator 150' still judges whether the LED module LM operates abnormally, and if yes, executes the protection process. When the driving voltage Vout abnormally increases and the voltage level of the voltage dividing node in the output voltage detecting circuit 320 is higher than a breakdown voltage of the zener diode Z2, the over-voltage protection circuit 360 generates the over-voltage notice signal ERR to the converting controller 120 for executing an over-voltage protection by the converting controller 120.

Figure 4:
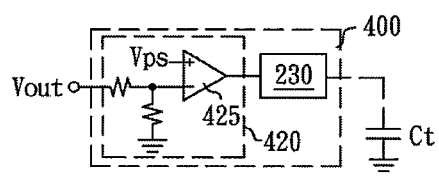
FIG. 4 is a schematic diagram of a low dimming protection blocking circuit according to a first embodiment of the present invention.

The low dimming protection blocking circuits of the two mentioned-above embodiments judge whether blocking the protection process of the current regulator based on that the voltage level of the driving voltage Vout is lower than the predetermined voltage or not. The dimming signal and the current controlling signal are auxiliary judgments and then they may be neglected. FIG. 4 is a schematic diagram of a low dimming protection blocking circuit according to a first embodiment of the present invention. Compared to the low dimming protection blocking circuit 200 shown in FIG. 2, the dimming detecting circuit 210 and the output voltage detecting circuit 220 are replaced with an output voltage detecting circuit 420 in a low dimming protection blocking circuit 400 of the present embodiment. The output voltage detecting circuit 420 comprises a voltage divider and a comparator 425. The voltage divider is coupled to the converting circuit for generating a divided voltage according to a driving voltage Vout of the converting circuit. The comparator 425 compares the divided voltage with a judgment voltage Vps and generates a protection blocking signal Sps to the protection blocking circuit 230 when the voltage level of the driving voltage Vout is lower than a predetermined voltage value to have the divided voltage being lower than the judgment voltage Vps. The descriptions of the protection blocking circuit 230 can be referred to the corresponding descriptions in the FIG. 2.

Figure 5:
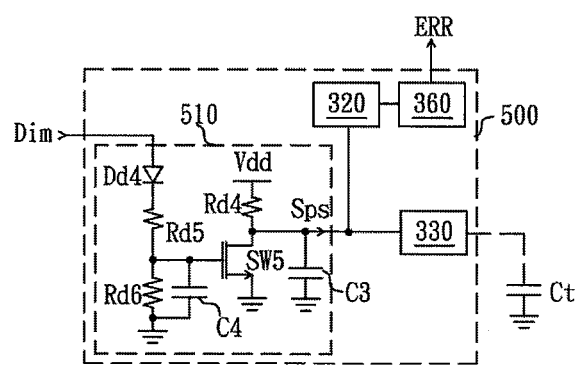
FIG. 5 is a schematic diagram of a low dimming protection blocking circuit according to a second embodiment of the present invention.

FIG. 5 is a schematic diagram of a low dimming protection blocking circuit according to a second embodiment of the present invention. Compared to the low dimming protection blocking circuit 300 shown in FIG. 3, the main difference there between is the structure of a low dimming protection blocking circuit. A dimming detecting circuit 510 comprises a diode Dd4, a RC circuit and a judgment circuit. The RC circuit comprises a capacitance C4, and resistances Rd5 and Rd6. The judgment circuit comprises a resistance Rd4, a switch SW5 and a capacitance C3. A positive end of the diode Dd4 is adapted to receive a dimming signal Dim and a negative end thereof is coupled to the RC circuit. The function of the resistance Rd5 is to regulate a charging rate of capacitance C4 by the dimming signal Dim and achieving an effect of restraining inrush current. The RC circuit is coupled to a controlled end of the switch SW5. An end of the resistance Rd4 is coupled to a positive voltage source Vdd and the other end thereof is coupled to the switch SW5. The capacitance C3 is coupled to a connection node of the switch SW5 and the resistance Rd4. The dimming signal Dim charges the capacitance C4 via the resistance Rd5 while the resistance Rd6 discharges the capacitance C4. A voltage level of the capacitance C4 cannot be increased enough to turn the switch SW5 on when the turn-on pulse width of the dimming signal Dim is smaller than a predetermined pulse width. The switch SW5 is turned off at this time. The positive current source Vdd charges the capacitance C3 via the resistance Rd4 for generating a protection blocking signal Sps. On the other hand, when the turn-on pulsed width of the dimming signal Dim is equal to or bigger than the predetermined pulse width, the voltage level of the capacitance C4 is increased to an enough voltage level to turn on the switch SW5 and so the capacitance C3 is discharged. At this time, a voltage waveform of the capacitance C3 is triangular and a peak voltage thereof is not enough to turn on the switch in the protection blocking circuit 330 and so the protection blocking signal Sps has no effect to block the protection process. Hence, the low dimming protection blocking circuit of the present invention further determines whether blocking the protection blocking circuit 330 to operate in response to the turn-on pulse width of the dimming signal Dim. In the present embodiment, the dimming signal can be replaced by the current controlling signal to judge whether blocking the protection process or not. In addition, the turn-on pulse width of the dimming signal dim means that the "high-level" pulse width in the present invention. It may be mean a "low-level" pulse width in some applications. The output voltage detecting circuit 320 which is an auxiliary circuit and may be omitted with no effect on the advantages of the present invention.

The low dimming protection blocking circuit of the present invention may be integrated with the current regulator in a single chip. The resistance or/and the capacitance in the RC circuit of the dimming detecting circuit may be external device(s) to be further adjustable for sensitivity in the dimming signal or the current controlling signal or adjust the predetermined pulse width according to actual situations.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. An LED driving circuit comprises:
   a converting circuit, adapted to perform a power conversion to convert an input power source into a driving voltage for lighting an LED module;
   a current regulator, coupled to the LED module to regulate a current flowing through the LED module, wherein the current regulator conducts and stops conducting the current flowing through the LED module according to a dimming signal, and executes a protection process when the LED module operates abnormally;
   a converting controller, controlling the power conversion of the converting circuit according to a voltage level of at least one connection node of the current regulator and the LED module; and
   a low dimming protection blocking circuit, coupled to the current regulator and the converting circuit, wherein the low dimming protection blocking circuit blocks the protection process of the current regulator when the driving voltage is lower than a predetermined voltage value.

2. The LED driving circuit according to claim 1, wherein the current regulator comprises at least one current regulating element, each of the current regulating element comprising:
   a transistor, coupled to a driving end of a corresponding one of the LED module and regulating a current flowing through the transistor according to a current controlling signal;
   a controller, detecting the current flowing through the transistor and accordingly generating the current controlling signal; and
   a protection circuit, detecting a state of the transistor for judging whether the LED module operates abnormally or not and turning the transistor off when the LED module operates abnormally.

3. The LED driving circuit according to claim 2, wherein the protection circuit comprises a counter which counts a time period of the LED module operating abnormally and generates a blocking conduction signal to turn the transistor off when the time period reaches a predetermined period.

4. The LED driving circuit according to claim 1, wherein the low dimming protection blocking circuit comprises:
an output voltage detecting circuit, coupled to the converting circuit and generating a protection blocking signal when the driving voltage is lower than the predetermined voltage; and
a protection blocking circuit, coupled to the output voltage detecting circuit and the protection circuit, and blocking the protection process of the current regulator when receiving the protection blocking signal.

5. An LED driving circuit comprises:
a converting circuit, adapted to perform a power conversion to convert an input power source into a driving voltage for lighting an LED module;
a current regulator, coupled to the LED module for regulating a current flowing through the LED module, wherein the current regulator conducts and stops conducting the current flowing through the LED module according to a dimming signal, and executes a protection process when the LED module operates abnormally;
a converting controller, controlling the power conversion of the converting circuit according to a voltage level of at least one connection node of the current regulator and the LED module; and
a low dimming protection blocking circuit, coupled to the current regulator, receiving the dimming signal, and blocking the protection process of the current regulator when a turn-on pulse width of the dimming signal is smaller than a predetermined pulse width.

6. The LED driving circuit according to claim 5, wherein the protection circuit comprises a counter which counts a time period of the LED module operating abnormally and generates a blocking conduction signal to turn a transistor off when the time period reaches a predetermined period.

7. The LED driving circuit according to claim 6, wherein the dimming detecting circuit comprises:
a RC circuit, adapted to receive the dimming signal; and
a judgment circuit, coupled to the RC circuit and determining whether generating the protection blocking signal according the a voltage level of the RC circuit.

8. The LED driving circuit according to claim 5, wherein the low dimming protection blocking circuit comprises:
a dimming detecting circuit, receiving the dimming signal and generating a protection blocking signal when a turn-on period or a turn-on duty cycle represented by the dimming signal is smaller than a predetermined value; and
a protection blocking circuit, coupled to the dimming detecting circuit and the protection circuit, and blocking the protection circuit when receiving the protection blocking signal.

9. The LED driving circuit according to claim 8, wherein the dimming detecting circuit comprises:
a RC circuit, adapted to receive the dimming signal; and
a judgment circuit, coupled to the RC circuit and determining whether generating the protection blocking signal according the a voltage level of the RC circuit.

10. An LED driving circuit comprises:
a converting circuit, adapted to perform a power conversion to convert an input power source into a driving voltage for lighting an LED module;
a current regulator, coupled to the LED module for regulating a current flowing through the LED module and comprising at least one current regulating element, in which each of the current regulating element comprises:
a transistor, coupled to a driving end of a corresponding one of the LED module and regulating a current flowing through the transistor according to a current controlling signal;
a controller, detecting the current flowing through the transistor and accordingly generating the current controlling signal, and controlling the transistor to conduct or stop conducting the current according to a dimming signal;
a protection circuit, detecting a state of the transistor for judging whether the LED operates abnormally or not and turning the transistor off when the LED module operates abnormally; and
a converting controller, controlling the power conversion of the converting circuit according to a voltage level of at least one connection node of the current regulator and the LED module; and
a low dimming protection blocking circuit, coupled to the current regulator, receiving the least one current controlling signal, and blocking the protection process of the current regulator when a pulse width of any one of the least one current controlling signal is smaller a predetermined pulse width.

11. The LED driving circuit according to claim 10, wherein the protection circuit comprises a counter which counts a time period of the LED module operating abnormally, and generates a blocking conduction signal to turn the transistor off when the time period reaches a predetermined period.

12. The LED driving circuit according to claim 11, wherein the dimming detecting circuit comprises:
a RC circuit, adapted to receive the dimming signal; and
a judgment circuit, coupled to the RC circuit and determining whether generating the protection blocking signal according to a voltage level of the RC circuit.

13. The LED driving circuit according to claim 10, wherein the low dimming protection blocking circuit comprises:
a dimming detecting circuit, receiving the dimming signal and generating a protection blocking signal when a turn-on period or a turn-on duty cycle represented by the dimming signal is smaller than a predetermined value; and
a protection blocking circuit, coupled to the dimming detecting circuit and the protection circuit and blocking the protection circuit when receiving the protection blocking signal.

14. The LED driving circuit according to claim 13, wherein the dimming detecting circuit comprises:
a RC circuit, adapted to receive the dimming signal; and
a judgment circuit, coupled to the RC circuit and determining whether generating the protection blocking signal according to a voltage level of the RC circuit.

* * * * *